US007938281B2

(12) United States Patent
Horntrich et al.

(10) Patent No.: US 7,938,281 B2
(45) Date of Patent: May 10, 2011

(54) LEAKPROOF BOTTLE FOR INFANT FOOD

(75) Inventors: Günter Horntrich, Köln (DE); Eckhard Itzek, Gyhum-Nartum (DE)

(73) Assignee: MAPA GmbH Gummi- und Plastikwerke, Zeven (DE)

( * ) Notice: Subject to any disclaimer, the term of this patent is extended or adjusted under 35 U.S.C. 154(b) by 467 days.

(21) Appl. No.: 12/089,586

(22) PCT Filed: Sep. 15, 2006

(86) PCT No.: PCT/EP2006/008996

§ 371 (c)(1), (2), (4) Date: Aug. 29, 2008

(87) PCT Pub. No.: WO2007/042117

PCT Pub. Date: Apr. 19, 2007

(65) Prior Publication Data

US 2009/0039049 A1 Feb. 12, 2009

(30) Foreign Application Priority Data

Oct. 8, 2005 (DE) ..................... 20 2005 015 828 U

(51) Int. Cl.
*A61C 5/00* (2006.01)

(52) U.S. Cl. ..................... 215/11.6; 215/11.1; 215/11.2; 215/11.3; 215/11.4; 215/11.5

(58) Field of Classification Search ................. 215/11.1, 215/11.2, 11.3, 11.4, 11.5, 11.6
See application file for complete search history.

(56) References Cited

U.S. PATENT DOCUMENTS

| | | | | |
|---|---|---|---|---|
| 4,856,995 | A * | 8/1989 | Wagner | 433/215 |
| 5,150,800 | A * | 9/1992 | Sarter et al. | 215/11.4 |
| 5,211,300 | A * | 5/1993 | Hsing et al. | 215/11.4 |
| 5,269,425 | A * | 12/1993 | Gomez-Acevedo | 215/11.1 |
| 7,150,369 | B1 * | 12/2006 | Fryar | 215/11.4 |
| 7,225,938 | B2 * | 6/2007 | Frisch | 215/11.4 |
| 7,331,478 | B2 * | 2/2008 | Aljadi | 215/11.4 |
| 7,677,402 | B2 * | 3/2010 | Mensah-Ouvor et al. | 215/11.4 |

FOREIGN PATENT DOCUMENTS

DE 10157071 C1 3/2003

OTHER PUBLICATIONS

International Search Report, Mailed May 2, 2007 (4 pages).

* cited by examiner

*Primary Examiner* — Anthony Stashick
*Assistant Examiner* — Cynthia F Collado
(74) *Attorney, Agent, or Firm* — Hiscock & Barclay, LLP

(57) ABSTRACT

A leakproof bottle for feeding a child includes a first external thread around a bottle opening, and a lower closure ring having a first internal thread, which is screwed onto the first external thread and has at least one first throughflow hole. An upper closure ring has a second external thread on which the lower closure ring sits in a sealing manner and which has at least one second throughflow hole which, by rotation of the upper closure ring relative to the lower closure ring, can be brought into coinciding and non-coinciding positions relative to the first throughflow hole. Locking elements can rotate the lower closure ring and upper closure ring relative to each other and releasable lock them, with a drinking teat and a screw ring having a second internal thread, which is screwed onto the second external thread of the upper closure ring, releasably securing a lower edge region of the drinking teat to upper closure ring.

23 Claims, 3 Drawing Sheets

LEAKPROOF BOTTLE FOR INFANT FOOD

FIELD OF THE INVENTION

The present invention is related to a leakproof bottle for infant food.

BACKGROUND OF THE INVENTION

In known bottles for infant food, the teat has a circumferential teat flange on its lower edge, which is sealingly secured on the edge of a bottle opening by means of a screw ring which is screwed onto an external thread of the bottle. In order to prevent liquid from leaking out in drinking breaks, a cover is laid between the teat flange and bottle edge and is clamped fast by means of the screw ring.

From DE 101 57 071 C1, a more user-friendly leakproof bottle for infant food is known. The same has a lower closure ring screwed onto the external thread of the bottle, which has a first fitting surface with at least one first throughflow hole. An upper closure ring has a second fitting surface with at least one second throughflow hole. The two closure rings are rotatably and releasably locked together with respect to each other via locking elements. By rotating the upper closure ring, the first and second throughflow holes can be brought into coincident and non-coincident positions. A drinking teat is screwed together with an external thread of the upper closure ring by means of a screw ring. When the throughflow holes coincide, infant food can be taken out via the drinking teat. When the throughflow holes do not coincide, removal of infant food via the drinking teat is disabled.

In the execution example, the closure rings have conical fitting surfaces. Further, sealing rings are present on the lower side of the lower closure ring and on the upper side of the first fitting surface. The lower closure ring has a locking projection, projecting towards the inside from the lower edge of the conical fitting surface, and the upper closure ring has catch tongues projecting from the lower edge of the second conical fitting surface, which engage behind the locking projection.

The manufacture and use of the leakproof bottle is still laborious in part. Due to the complex shape in space, contaminations are easily accumulated on the closure rings. The catch tongues come into contact with the infant food and must be touched for mounting. Cleaning the closure rings is laborious.

SUMMARY OF THE INVENTION

Based on these facts, the present invention has the objective to provide a leakproof bottle for infant food which facilitates the manufacture and the use thereof.

The objective is resolved by providing a leakproof bottle for infant food.

According to one aspect, a leakproof bottle for infant food is provided with a bottle with a first external thread around a bottle opening, a lower closure ring, which has a substantially cylindrical first covering portion with a first internal thread which is screwed onto the first external thread, and which features a first central portion connected to the upper edge of the first covering portion, having a substantially flat first fitting surface, rotationally symmetric around a longitudinal axis and facing away from the bottle interior, and at least one first throughflow hole, running into the first fitting surface at the one side and into a side of the first central part facing towards the bottle interior at the other side, an upper closure ring, which has a substantially cylindrical second covering portion with a second external thread and which features a second central portion, connected with the second covering portion and having a substantially flat second fitting surface, rotationally symmetric around a longitudinal axis and sitting sealingly on the first fitting surface, and at least one second throughflow hole, running into the second fitting surface at the one side and into a side of the second central portion facing away from the same at the other side, which can be brought into coincident and non-coincident positions in relation to the first throughflow hole by rotating the upper closure ring in relation to the lower closure ring, locking elements which lock the lower closure ring and the upper closure ring with each other, rotatably and releasably with respect to each other, a drinking teat and a screw ring with a second internal thread, which is screwed onto the second external thread of the upper closure ring and which releasably secures a lower edge region of the drinking teat on the upper closure ring.

Through the flat execution of the first and second fitting surfaces, the manufacture of the lower and upper closure rings is simplified, the accumulation of food remainders and contaminations is avoided and cleaning of the closure rings is facilitated. The user may conceive the function of the leak protection more easily and it is simpler for her to do away with dysfunctions. Also, the use is facilitated by the fact that the opening and closing positions can be better recognized, when the throughflow openings come into coincidence in the fitting areas. Altogether, a leakproof bottle is provided which is more manufacturing and user friendly.

According to another aspect, a leakproof bottle for infant food, is provided with a bottle with a first external thread around a bottle opening, a lower closure ring, which has a substantially cylindrical first covering portion with a first internal thread which is screwed onto the first external thread, and which features a first central portion connected to the upper edge of the first covering portion, having a first fitting surface, rotationally symmetric around a longitudinal axis and facing away from the bottle interior, at least one first throughflow hole, running into the first fitting surface at the one side and into a side of the first central portion facing towards the bottle interior at the other side, and a soft elastic sealing material made of plastic material, injection-moulded to the first fitting surface at least around the edge of the throughflow hole and to a sealing surface sealingly sitting on the upper bottle edge, which is extended from the first fitting surface through the first throughflow hole along the side facing towards the bottle interior up to the sealing surface of the first central portion, an upper closure ring, which has a substantially cylindrical second covering portion with a second external thread and which features a second central portion connected with the second covering portion, having a second fitting surface, rotationally symmetric around a longitudinal axis and sitting sealingly on the first fitting surface, and at least one second throughflow hole, running into the second fitting surface at the one side and into a side of the second central part facing away from the same at the other side, which can be brought into coincident and non-coincident positions in relation to the first throughflow hole by rotating the upper closure ring in relation to the lower closure ring, locking elements which lock the lower closure ring and the upper closure ring with each other, rotatably and releasably with respect to each other, a drinking teat and a screw ring with a second internal thread, which is screwed onto the second external thread of the upper closure ring and which releasably secures a lower edge region of the drinking teat on the upper closure ring.

In this bottle, the sealing material extends from the fitting surface through the throughflow holes across the side facing the bottle interior up to the sealing surface of the first central portion. As a consequence, the sealing material can be produced in one manufacturing step with a less sumptuous injection molding tool, than the separate sealing rings of the aforementioned leak-out protection. Further, the accumulation of the sealing material completely surrounding the edge of the throughflow hole avoids contaminations in the sealing region. Even this bottle is more manufacturing and user friendly altogether.

According to still another aspect, a leakproof bottle for infant food, is provided with a bottle with a first external thread around a bottle opening, a lower closure ring, which has a substantially cylindrical first covering portion with a first internal thread which is screwed onto the first external thread, and which features a first central portion connected to the upper edge of the first covering portion, having a first fitting surface, rotationally symmetric around a longitudinal axis and facing away from the bottle interior, and at least one first throughflow hole, running into the first fitting surface at the one side and into a side of the first central portion facing towards the bottle interior at the other side, an upper closure ring, which has a substantially cylindrical second covering portion with a second external thread and which features a second central portion connected with the second covering portion, having a substantially flat second fitting surface, rotationally symmetric around a longitudinal axis and sitting sealingly on the first fitting surface, and at least one second throughflow hole, running into the second fitting surface at the one side and into a side of the second central part facing away from the same at the other side, which can be brought into covering and non-covering positions in relation to the first throughflow hole by rotating the upper closure ring in relation to the lower closure ring, a bayonet catch between the lower closure ring and the upper closure ring, which locks the same rotatably and releasably with respect to each other, a drinking teat and a screw ring with a second internal thread, which is screwed onto the second external thread of the upper closure ring and which releasably secures a lower edge region of the drinking teat on the upper closure ring.

Through the fact that there is a bayonet catch between the lower closure ring and the upper closure ring in this bottle, it is possible to arrange the locking mechanism outside of the region of the closure rings, which comes into contact with infant food. Through this, it is counteracted against an accumulation of contaminants and the expense for cleaning the leak-out protection is reduced. In addition, by the separation of valve region and locking region of the leak-out protection, the understanding and with it the operation of the bottle is facilitated for the user. Further, it is not necessary for opening the bayonet catch that the user touches parts which are soiled by foodstuffs. Finally, the bayonet catch can be produced with less expenditure than the known locking mechanism with catching elements formed on the fitting surfaces. Even this solution is advantageous for manufacture and use.

According to one embodiment, the lower closure ring in the linking region of the first covering portion and the first central portion and the upper closure ring in the linking region of the second covering portion and the second central portion have circumferential first and second guiding surfaces sitting close to each other. The guiding surfaces constitute bearing surfaces for a rotational mounting of the closure rings one to the other. The bearing and sealing functions are divided up between the fitting surfaces and the guiding surfaces, and through this they are achieved more securely.

According to one embodiment, the guiding surfaces are present on first and second steps of the lower closure ring and the upper closure ring. On the steps, the closure rings are guided axially and/or radially one on the other.

According to one embodiment, the planar first and/or second fitting surfaces are present on first and/or second disc-shaped sections of the first and/or second central portions. According to a further embodiment, the first and/or second central portions have first and/or second cylindrical sections connected to the outer perimeter of the first and/or second disc-shaped sections. According to a further embodiment, the first and/or second cylindrical sections are connected at the downside with the first and/or second steps. According to a further embodiment, the first step features the sealing surface at the inside.

According to one embodiment, the sealing material is extended in the first fitting surface in a circular surface containing the first throughflow hole around the longitudinal axis of the first closure ring and/or on the perimeter of the first throughflow hole at the inside and/or along a stripe from the first throughflow hole up to the sealing surface and/or along a circular annular sealing surface. According to a further embodiment, the first fitting surface features sealing ribs made of the sealing material, departing from the longitudinal axis of the first closure ring and spirally extended around the longitudinal axis.

According to one embodiment, the bayonet catch has at least one claw projecting towards the inside on the upper closure ring, and on the lower closure ring at least one complementary longitudinal groove and at least one complementary ring groove departing from the lower end of the longitudinal groove. According to an alternative embodiment, the bayonet catch has at least one claw projecting towards the outside on the lower closure ring, and on the upper closure ring at least one complementary longitudinal groove and at least one complementary ring groove departing from the lower end of the longitudinal groove.

According to one embodiment, a catch projection is present in the ring groove besides to the longitudinal groove, across which the claw is turnable under elastic deformation. According to a further embodiment, the throughflow holes are in coincidence when the claw has just fallen into the ring groove behind the catch projection. The catch projection secures the bayonet connection against unvoluntary release and indicates the rotational position to the user in which food can be taken out through the drinking teat.

According to one embodiment, the ring groove has a stop at the end distant from the joint to the longitudinal groove. According to a further embodiment, the through holes do not coincide with each other when the claw sits on the stop. The stop prevents also an unvoluntary release of the bayonet catch. Further, it indicates to the user that the throughflow holes are in the blocking position.

The present invention incorporates alternative embodiments, wherein the throughflow holes are blocked when the claw has fallen into the ring groove just behind the catch projection and in which the throughflow holes are coincident with each other when the claw sits close to the stop, i.e., the reversal of the aforementioned embodiments.

According to a further embodiment, the fitting surfaces have catch elements assigned to each other, which catch into each other when the upper closure ring and the lower closure ring are in an opening position and/or in a locking position. The catch elements can secure the closure rings in the desired positions, in particular in connection with the catch projection and/or the stop.

According to one embodiment, the lower closure ring has a mark next to the catch projection and is structurally weakened in the region of the mark, so that by pressing against the mark, the catch projection can be moved radially towards the inside and the claw can be turned across the catch projection into the longitudinal groove with reduced expenditure of force. For the user, this embodiment facilitates releasing the bayonet catch by getting over the catch projection.

According to one embodiment, the catch projection and/or at least one of the catch elements is/are a ramp, which is chamfered in the locking and/or unlocking position.

According to a further embodiment, the lower closure ring and the upper closure ring have two throughflow holes. Through this, high delivery rates in the opening position and secure sealing in the blocking position of the leak-out protection are promoted.

According to a further embodiment, the bayonet catch has two claws, two longitudinal grooves and two ring grooves. When these elements of the bayonet catch are arranged symmetrically, the operation is facilitated, above all because the bayonet catch can be locked or unlocked, respectively, in a turn about almost 180°.

Finally, according to one embodiment, the lower closure ring and/or the upper closure ring is/are a single-component and/or multicomponent injection moulded piece.

BRIEF DESCRIPTION OF THE DRAWINGS

In the following, the present invention is explained in more detail by means of the attached drawings of an example of its execution.

DETAILED DESCRIPTION

Figure 1:
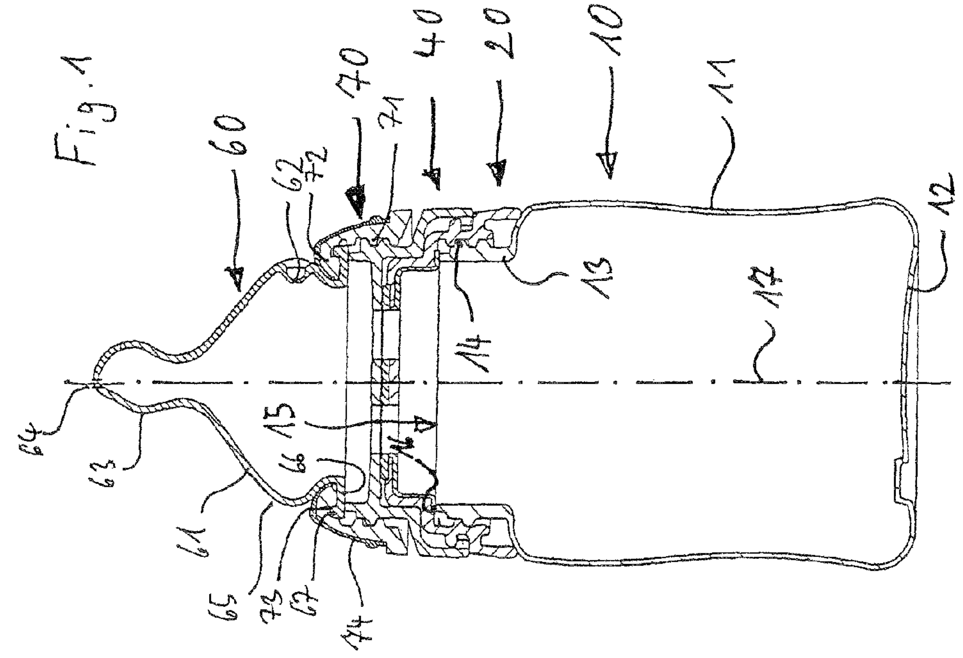
FIG. 1 represents a bottle with leak-out protection and drinking teat in a vertical section.
Figure 4:
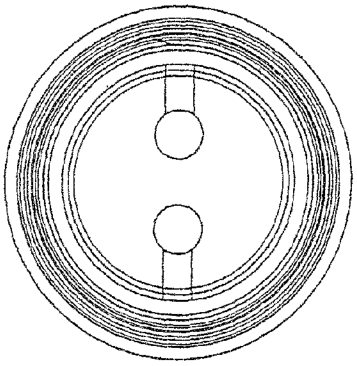
FIG. 4 depicts the leak-out protection in a plan view.
Figure 2:
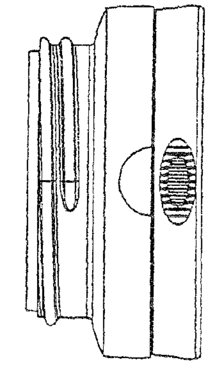
FIG. 2 depicts the bottle of FIG. 1 in partial view, illustrating the leak-out protection, consisting of lower closure ring and upper closure ring in a front view.
Figure 3:
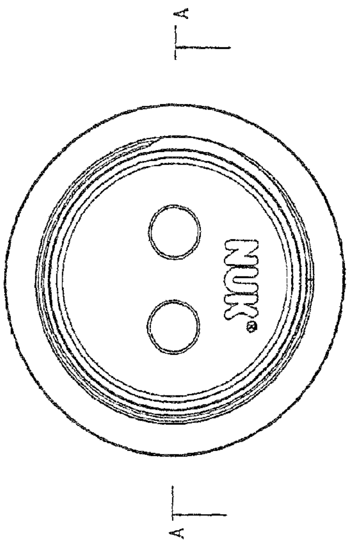
FIG. 3 depicts the leak-out protection in a top view.

In the description, the orientation designations “up” and “down” are related to the arrangement of the bottle with the bottom on a horizontal support and the drinking teat on the upper end.

According to FIG. 1 to 4, the leakproof bottle 10 features a lower closure ring 20, an upper closure ring 40, a drinking teat 60 and a screw ring 70.

The bottle 10 has a cylindrical, constricted bottle body 11, which has a bottom 12 on the lower end and a neck 13 on the upper end. The neck 13 is realized as a wide neck, but has a smaller diameter than the region of the bottle body 11 situated below it. The neck 13 has a single-flight first external thread 14 and on the topside it has a bottle opening 15. The bottle opening 15 is surrounded by an upper bottle edge 16. The bottle 10 has a longitudinal central axis 17.

Figure 5:
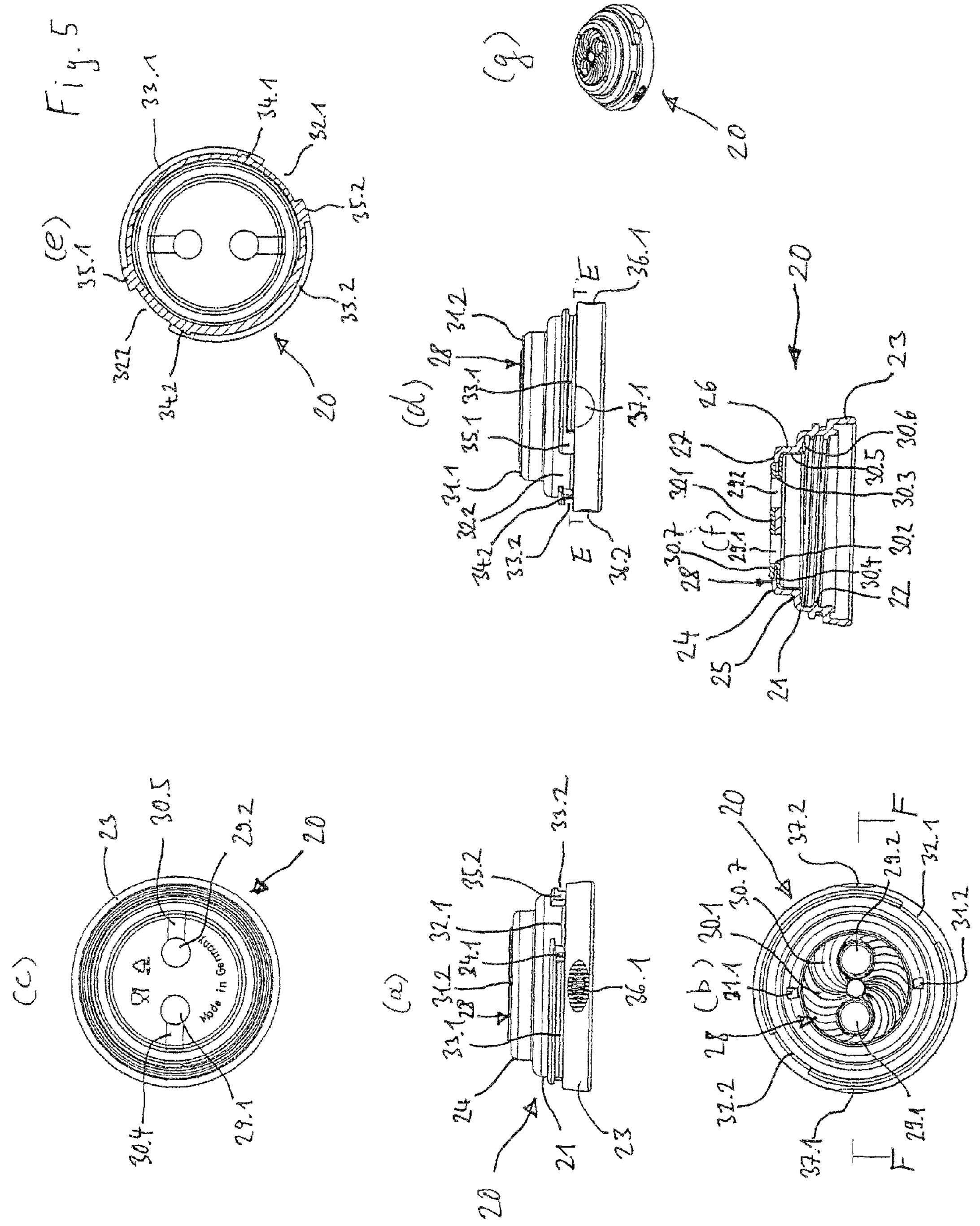
FIG. 5_a_ to _g_ depicts the lower closure ring in a front view (FIG. 5_a_), in a top view (FIG. 5_b_), in a plan view (FIG. 5_c_), in a side view (FIG. 5_d_), in a section along the line E-E of FIG. 5_d_ (FIG. 5_e_), in a section along the line F-F of FIG. 5_b_ (FIG. 5_f_), in a perspective view skew from the topside, and from the side (FIG. 5_g_)

As can be seen from FIG. 5 in particular, the lower closure ring 20 has a substantially cylindrical first covering portion 21, which has a first internal thread 22 on its inside perimeter, which is screwed onto the first external thread 14 according to FIG. 1. A skirt 23 projects radially towards the outside and the downside from the perimeter of the first covering portion 21, which laterally shields the bottleneck 13.

The lower closure ring 20 has a first central portion 24 connected to the upper edge of the first covering portion 21, which comprises plural sections: adjacent to the first covering portion 21, it has a first step 25.

From the inside perimeter of the first step 25, a first cylindrical section 26 extends upward. With the upper edge of the first cylindrical portion 26, a first (circular) disc-shaped section 27 is connected, which has a first fitting surface 28 on the topside.

The first disc-shaped section 27 has two throughflow holes 29.1, 29.2, which departing from the fitting surface 28 extend towards the side of the first disc-shaped section 27 facing away from it.

The lower closure ring 20 is made of a plastic material, PP for instance. A soft elastic sealing material 30 is injection-molded onto the lower closure ring 20. On the first fitting surface 28, the same has a circular section 30.1 surrounding the throughflow holes 29.1, 29.2. Further, it has one stripe-shaped section 30.2, 30.3 at a time on the inside perimeter of the throughflow holes 29.1, 29.2.

On the lower side of the disc-shaped section 27, there are additional stripe-shaped sections 30.4, 30.5, departing from the stripe-shaped sections 30.2, 30.3, which run down on the inner side of the cylindrical section 26. At the downside, the stripe-shaped sections 30.4, 30.5 are connected with an annular circumferential fitting surface from the same material, which is arranged on the inner side of the step 25. The sealing material 30 is a thermoplastic elastomer (TPE), for instance.

In addition, the lower closure ring 20 has spiral ribs 30.7 on the circular section 30.1 of the sealing material, which depart from the centre of the circular section 30.1 and extend up to the edge of the circular section 30.1.

In addition, the circular section 27 has two diametrically opposing ramp-shaped locking element 31.1, 31.2 near to its edge.

At the downside, the first covering portion 21 has two opposing longitudinal grooves 32.1, 32.2, which are each one at a time connected with one ring groove 33.1, 33.2, which are limited by the skirt 23 at the downside. Besides to the longitudinal groove 32.1, 32.2, one catch projection 34.1, 34.2 at a time is existing in the adjoining ring groove 33.1, 33.2. The catch projections 34.1, 34.2 each have a chamfering towards the ring grooves 33.1, 33.2.

The ring grooves 33.1, 33.2 are each one limited by stops 35.1, 35.2 at the opposing ends, which separate the ring grooves 33.1, 33.2 from the respective neighbouring longitudinal grooves 32.2, 32.1 at the same time.

On the skirt 23, there are two marks at a time on diametrically opposing perimeter regions at the outer side, in the form of an elliptic depression 36.1, 36.2 with a ribbing and—offset about 90°—in the form of a smooth, semicircular depression 37.1, 37.2. By pressing against the elliptic depressions 36.1, 36.2, it is possible to displace the catch projections 34.1, 34.2 arranged alongside somewhat towards the inner side.

Figure 6:
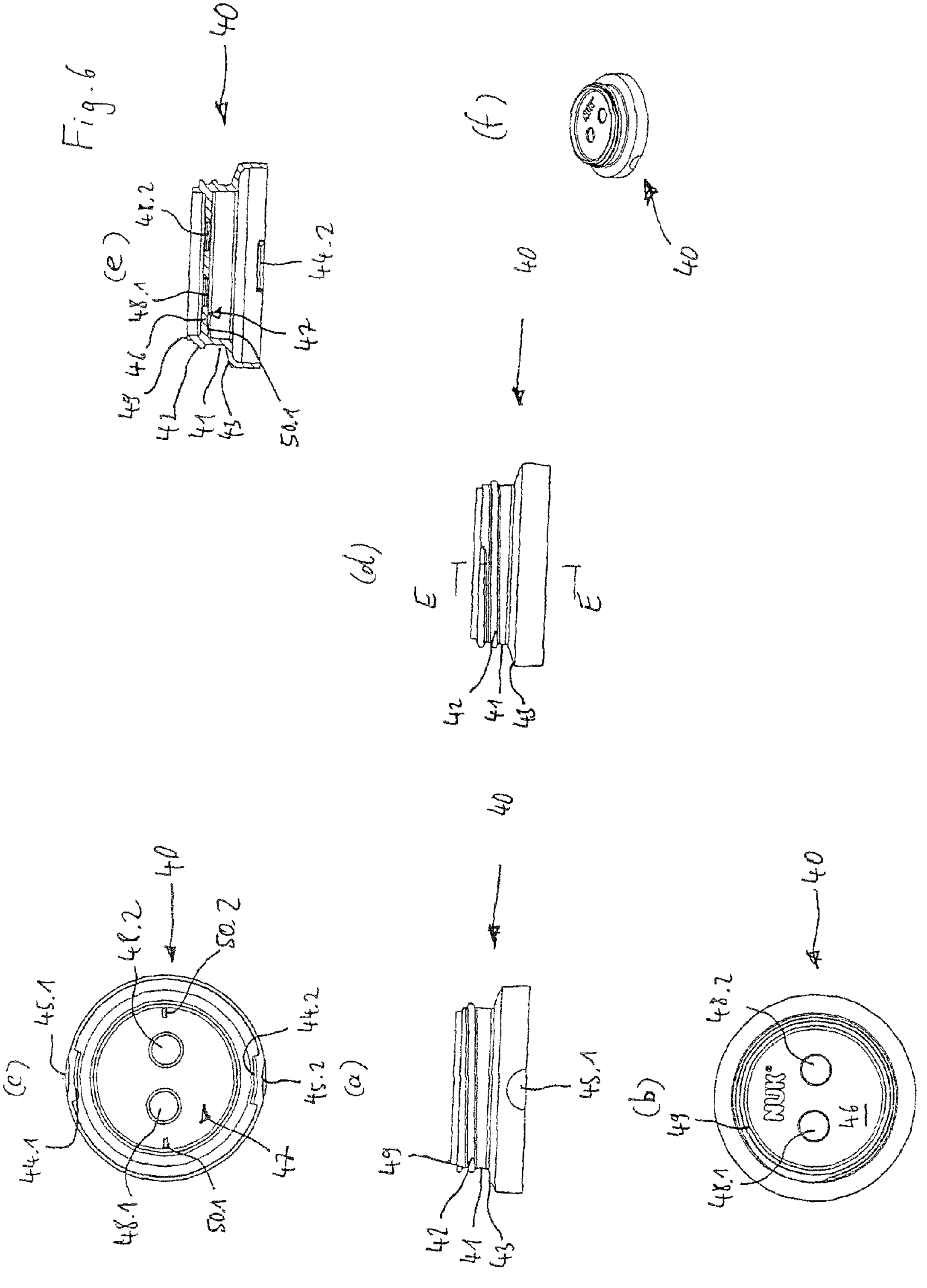
FIG. 6_a_ to _f_ depicts the lower closure ring in a front view (FIG. 6_a_), in a top view (FIG. 6_b_), in a plan view (FIG. 6_c_), in a side view (FIG. 6_d_), in a section along the line E-E of FIG. 6_d_ (FIG. 6_e_), in a perspective view skew from the topside, and from the side (FIG. 6_f_)

According to FIG. 6, the upper closure ring 40 has a substantially cylindrical, second covering portion 41 with a second external thread 42 on the outer perimeter.

The second covering portion 41 is connected with a second step 43 at the donwside. The second step 43 has two projecting claws 44.1, 44.2 at the inner perimeter, which are opposed diametrically to each other. At the outside, it has smooth, semi-circular deepenings 45.1, 45.2, which are arranged exactly opposite to the claws 44.1, 44.2.

The second covering portion 41 is connected to a second covering portion 46 at the inner perimeter, which is formed by a (circular-) disc-shaped section. The disc-shaped section 46 has a second fitting surface 47 at the downside. Departing from the fitting surface 47, two second throughflow holes 48.1, 48.2 cross the disc-shaped section. The second throughflow holes 48.1, 48.2 can be placed to be coincident with respect to the throughflow holes 29.1, 29.2 of the lower closure ring 20.

The second covering portion 41 has a circumferential second sealing surface 49 at the upper end.

Besides to the fitting surface, the disc-shaped section 46 has two locking elements 50.1, 50.2, which are opposed diametrically to each other.

The upper closure ring 40 is made of polypropylene, for instance.

According to FIG. 1, the drinking teat 60 has a mouthpiece 61 with a slit valve 62 and a nipple 63 with a drinking hole 64 at the end, and a snout 65 carrying the mouthpiece 61. At the lower edge of the snout 65, it has a teat flange 66 directed towards the outside, with a sealing bead 67 protruding towards the upside. The drinking teat 60 is made of rubber or of silicone rubber, for instance.

The screw ring 70 has a second internal thread 71 and a ring flange 72 projecting radially from the upper edge towards the inside, with an additional ring groove 73 at the lower side. The screw ring 70 is screwed together with the external thread 47. The ring flange 66 is pressed against the upper sealing surface 47 of the second closure ring 40. The sealing bead 67 is fixed in the circumferential additional ring groove 73 at the inner side of the ring flange 72.

The screw ring 70 has a coating 74 of a soft elastic plastic material on its outer perimeter. The screw ring is injection-molded from PP, for instance. The soft elastic material is a TPE injection-molded thereon, for instance.

In the assembled arrangement according to FIGS. 1 to 4, the upper closure ring 40 is inserted into the longitudinal grooves 32.1, 32.2 with the claws 44.1, 44.2 and catched in the ring grooves 33.1, 33.2, overcoming the catch projections 34.1, 34.2. In this situation, the throughflow holes 48.1, 48.2 are arranged coincidentally above the throughflow holes 29.1, 29.2. Drinking food filled into the bottle body 11 can be taken out via the drinking teat 60.

By turning the upper closure ring 40 around about 90° with respect to the lower closure ring 20, such that the claws 44.1, 44.2 sit closely to the stops 35.1, 35.2, the throughflow holes 48.1, 48.2 can be brought into a position which is rotated around about 90° with respect to the throughflow holes 29.1, 29.2. In the fitting surfaces 28, 47, the throughflow holes 48.1, 48.2 are sealed with respect to the throughflow holes 29.1, 29.2, so that liquid cannot pass through. In this position, the semicircular marks 37.1, 37.2 are situated exactly below the semicircular marks 45.1, 45.2, so that the user can easily recognise this position or feel it, respectively. In this position, infant food arranged in the bottle body 11 cannot leak out through the leak protection into the drinking teat 60.

The bottle can be disassembled easily by screwing off the screw ring 70 from the upper closure ring 40 and by screwing off the lower closure ring 20 from the bottle 10. Further, the upper closure ring 40 can be taken off from the lower closure ring 20 by turning the upper closure ring 40 at first, until the claws 44.1, 44.2 sit close to the catch projections 34.1, 34.2. Thereafter, the user presses the elliptic surfaces 36.1, 36.2 towards the inside, so that the catch projections 34.1, 34.2 are displaced somewhat towards the inside, and the claws can be easily turned into the longitudinal grooves 32.1, 32.2. Thereafter, the upper closure ring 40 can be easily pulled off from the lower closure ring 20. The individual parts can be cleaned thoroughly. The assembly of the bottle can be performed in the reverse order.

The invention claimed is:

1. A leakproof bottle for infant food, said bottle comprising:

a bottle with a first external thread around a bottle opening, a lower closure ring, having a substantially cylindrical first covering portion with a first internal thread which is screwed onto the first external thread, and which features a first central portion connected to the upper edge of the first covering portion, having a substantially flat first fitting surface, rotationally symmetric around a longitudinal axis and facing away from the bottle interior, and at least one first throughflow hole, running into the first fitting surface at the one side and into a side of the first central part facing towards the bottle interior at the other side;

an upper closure ring, which has a substantially cylindrical second covering portion with a second external thread and which features a second central portion, connected with the second covering portion, and having a substantially flat second fitting surface, rotationally symmetric around a longitudinal axis and sitting sealingly on the first fitting surface, and at least one second throughflow hole , running into the second fitting surface at the one side and into a side of the second central portion facing away from the same at the other side, which can be brought into coincident and non-coincident positions in relation to the first throughflow hole by rotating the upper closure ring in relation to the lower closure ring;

locking elements which lock the lower closure ring and the upper closure ring with each other, rotatably and releasably with respect to each other;

a drinking teat; and a screw ring with a second internal thread, which is screwed onto the second external thread of the upper closure ring and which releasably secures a lower edge region of the drinking teat on the upper closure ring.

2. A leakproof bottle for infant food, comprising:

a bottle with a first external thread around a bottle opening;

a lower closure ring, which has a substantially cylindrical first covering portion with a first internal thread which is screwed onto the first external thread, and which features a first central portion connected to the upper edge of the first covering portion, having a first fitting surface, rotationally symmetric around a longitudinal axis and facing away from the bottle interior, at least one first throughflow hole, running into the first fitting surface at the one side and into a side of the first central portion facing towards the bottle interior at the other side, and a soft elastic sealing material made of plastic material, injection-moulded to the first fitting surface at least around the edge of the throughflow hole and to a sealing surface sealingly sitting on the upper bottle edge, which is extended from the first fitting surface through the first throughflow hole along the side facing towards the bottle interior up to the sealing surface of the first central portion;

an upper closure ring which has a substantially cylindrical second covering portion with a second external thread and which features a second central portion connected with the second covering portion, having a second fitting surface, rotationally symmetric around a longitudinal axis and sitting sealingly on the first fitting surface, and at least one second throughflow hole, running into the second fitting surface at the one side and into a side of the second central part facing away from the same at the other side, which can be brought into coincident and non-coincident positions in relation to the first throughflow hole by rotating the upper closure ring in relation to the lower closure ring;

locking elements which lock the lower closure ring and the upper closure ring with each other, rotatably and releasably with respect to each other;

a drinking teat; and a screw ring with a second internal thread, which is screwed onto the second external thread of the upper closure ring and which releasably secures a lower edge region of the drinking teat on the upper closure ring.

3. A leakproof bottle for infant food, comprising;

a bottle with a first external thread around a bottle opening;

a lower closure ring, which has a substantially cylindrical first covering portion with a first internal thread which is screwed onto the first external thread, and which features a first central portion connected to the upper edge of the first covering portion, having a first fitting surface, rotationally symmetric around a longitudinal axis and facing away from the bottle interior, and at least one first throughflow hole, running into the first fitting surface at the one side and into a side of the first central portion facing towards the bottle interior at the other side;

an upper closure ring, which has a substantially cylindrical second covering portion with a second external thread and which features a second central portion connected with the second covering portion, having a substantially flat second fitting surface, rotationally symmetric around a longitudinal axis and sitting sealingly on the first fitting surface, and at least one second throughflow hole, running into the second fitting surface at the one side and into a side of the second central part facing away from the same at the other side, which can be brought into coincident and non-coincident positions in relation to the first throughflow hole by rotating the upper closure ring in relation to the lower closure ring;

a bayonet catch between the lower closure ring and the upper closure ring, which locks the same with each other, rotatably and releasably with respect to each other;

a drinking teat; and a screw ring with a second internal thread, which is screwed onto the second external thread of the upper closure ring and which releasably secures a lower edge region of the drinking teat on the upper closure ring.

4. A bottle according to claim 1, wherein the lower closure ring in the linking region of the first covering portion and the first central portion and the upper closure ring in the linking region of the second covering portion and the second central portion have circumferential first and second guiding surfaces sitting close to each other.

5. A bottle according to claim 4, wherein the guiding surfaces are present on first and second steps of the lower closure ring and the upper closure ring.

6. A bottle according to claim 1, wherein at least one of the planar first and second fitting surfaces are present on first and/or second disc-shaped sections of the first and/or second central portions.

7. A bottle according to claim 6, wherein at least one of the first and second central portions have first and/or second cylindrical sections connected to the outer perimeter of the first and/or second disc-shaped sections.

8. A bottle according to claim 7, wherein at least one of the first and second cylindrical sections are connected at the downside with at least one of the first and second steps.

9. A bottle according to claim 5, wherein the first step features the sealing surface at the inside.

10. A bottle according to claim 2, wherein the sealing material in the first fitting surface is extended in a circular surface containing the first throughflow hole around the longitudinal axis of the first closure ring and/or on the perimeter of the first throughflow hole at the inside and/or along a stripe from the first throughflow hole up to the sealing surface and/or along a circular annular sealing surface.

11. A bottle according to claim 2, wherein the first fitting surface features sealing ribs made of the sealing material, departing from the longitudinal axis of the first closure ring and spirally extended around the longitudinal axis.

12. A bottle according to claim 3, wherein the bayonet catch features at least one claw projecting towards the inside on the upper closure ring, and on the lower closure ring at least one complementary longitudinal groove and at least one complementary ring groove departing from the lower end of the longitudinal groove.

13. A bottle according to claim 3, wherein the bayonet catch features at least one claw projecting towards the outside on the lower closure ring, and on the upper closure ring at least one complementary longitudinal groove and at least one complementary ring groove departing from the lower end of the longitudinal groove.

14. A bottle according to claim 12, wherein a catch projection is present in the ring groove besides to the longitudinal groove, across which the claw is turnable under elastic deformation.

15. A bottle according to claim 14, wherein the first and second throughflow holes are in coincidence when the claw has just fallen into the ring groove behind the catch projection.

16. A bottle according to claim 12, wherein the ring groove has a stop at the end distant from the joint to the longitudinal groove.

17. A bottle according to claim 16, wherein the first and second throughflow holes do not coincide with each other when the claw sits on the stop.

18. A bottle according to claim 3, wherein the fitting surfaces have catch elements assigned to each other, which catch into each other when the upper closure ring and the lower closure ring are in an opening position and/or in a locking position.

19. A bottle according to claim 3, wherein the lower closure ring has a mark next to the catch projection and is structurally weakened in the region of the mark, so that by pressing against the mark, the catch projection can be moved radially towards the inside and the claw can be turned across the catch projection into the longitudinal groove with reduced expenditure of force.

20. A bottle according to claim 14, wherein the catch projection and/or at least one of the catch elements is defined by a ramp, which is chamfered in the locking and/or unlocking position.

21. A bottle according to claim 1, which has two throughflow holes in the lower closure ring and two throughflow holes in the upper closure ring.

22. A bottle according to claim 3, wherein the bayonet catch has two claws, two associated longitudinal grooves and two ring grooves.

23. A bottle according to claim 1, wherein at least one of the lower closure ring and the upper closure ring is a single-component and/or multicomponent injection molded piece.

* * * * *